Feb. 19, 1963   M. FRIEDMAN ETAL   3,078,356
SAMPLING SWITCH
Filed July 20, 1960   3 Sheets-Sheet 1
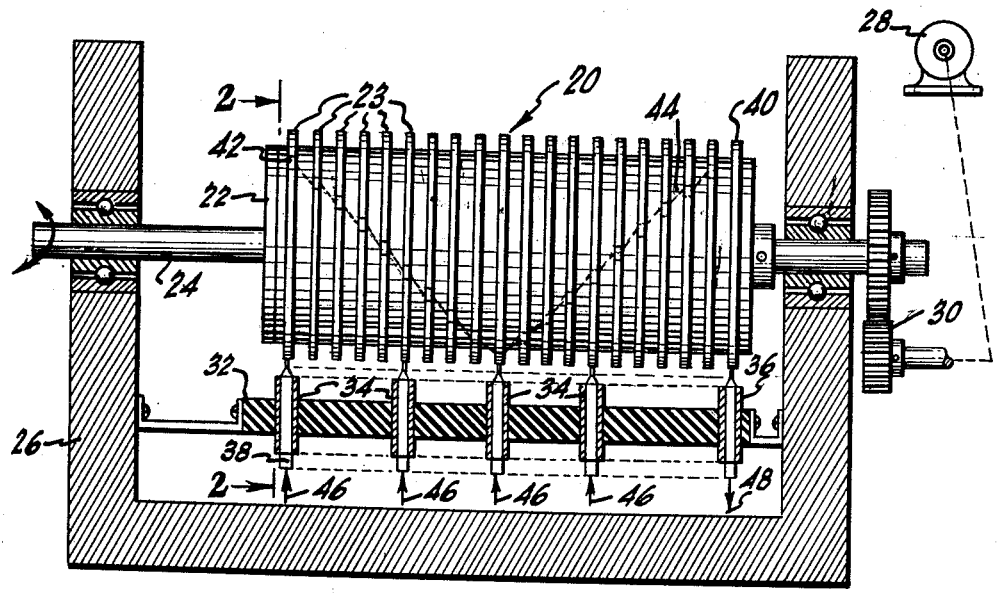
Fig.1.
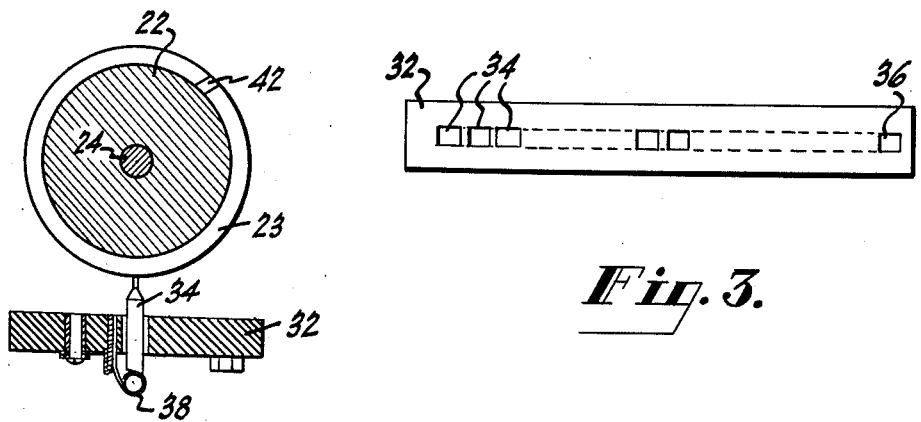
Fig. 2.
Fig. 3.
INVENTORS
MILTON FRIEDMAN &
IRVING P. MAGASINY
BY Edward M. Farrell
ATTORNEY Feb. 19, 1963    M. FRIEDMAN ETAL    3,078,356
SAMPLING SWITCH
Filed July 20, 1960    3 Sheets-Sheet 2

INVENTORS
MILTON FRIEDMAN &
IRVING P. MAGASINY
BY Edward M. Farrell
ATTORNEY

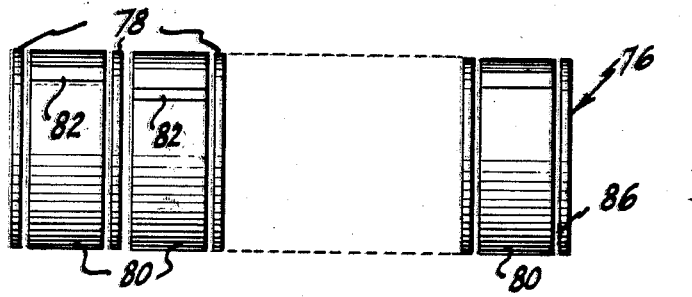
Fig. 7.
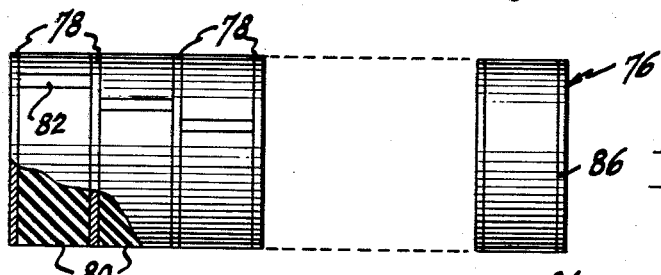
Fig. 8.
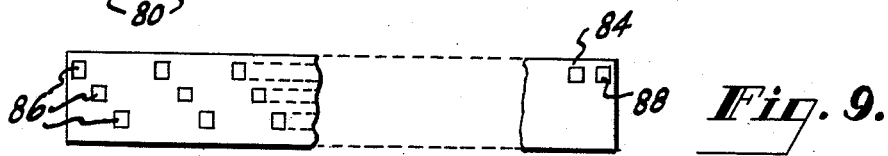
Fig. 9.
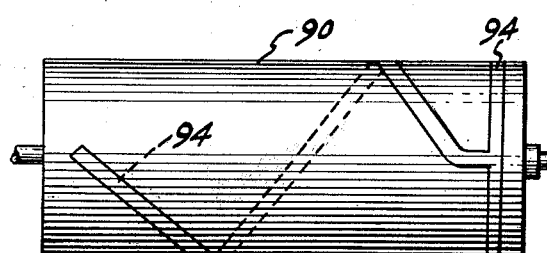
Fig. 11.
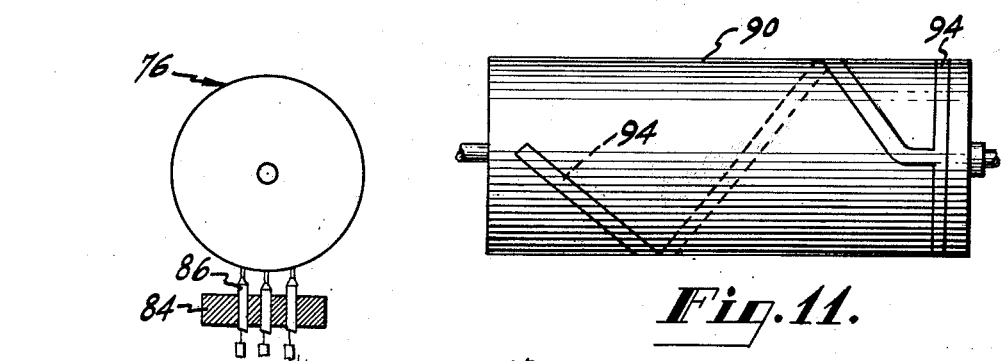
Fig. 10.
Fig. 12.
INVENTORS
MILTON FRIEDMAN &
IRVING P. MAGASINY
BY Edward M Farrell
ATTORNEY

United States Patent Office 3,078,356
Patented Feb. 19, 1963

3,078,356
SAMPLING SWITCH
Milton Friedman, Roslyn, and Irving P. Magasiny, Philadelphia, Pa., assignors to Schaevitz Engineering, a corporation of New Jersey
Filed July 20, 1960, Ser. No. 44,098
2 Claims. (Cl. 200—24)

This invention relates to mechanical switching devices or commutators, and more particularly to such devices which are used for sampling electrical signals from a plurality of signal sources or for decommutation.

In many systems, it is often necessary to measure signals from a large number of signal sources. For example, when a telemetering system is employed in a guided missile, pilotless aircraft or a projectile, measurement of acceleration, temperature, pressure, current and numerous other functions are often necessary. Such a telemetering system generally includes transducers which convert each variable quantity to be measured into a corresponding electrical signal. The electrical signals from the transducers may then be used to modulate sub-carrier oscillators, coding devices and transmitters directly. The electrical signals may also be recorded on magnetic tape or other suitable means. The output signal from the coding device or sub-carrier oscillators or other devices as the case may be may, in turn, be used to modulate the carrier signal of a high frequency transmitter. A carrier signal transmitted from the transmitter in a guided missile, for example, may then be received by a receiving station on the ground or other remote point. Suitable demodulation means are employed to restore the electrical signals originating at the transducers. Since these electrical signals are functions of the variable quantity measured, indications of the character of the measured functions are readily attainable.

In order to utilize available bandwidth to its greatest extent, especially where the amount of desired information is great and the available bandwidth is relatively small, it is desirable to use multiplexing circuits. The use of multiplexing circuits permits the use of so-called time division or frequency division methods to impress a number of information signals upon a single carrier signal.

A time division system may utilize a single coding channel, such as a pulse code modulator, a pulse amplitude to pulse width modulator or a sub-carrier oscillator associated with a plurality of transducers with the electrical outputs from the transducers periodically sampled. This time division method permits a maximum amount of information utilizing a single code channel. In carrying out such time division methods, mechanical switching devices or commutators are often used since they are relatively simple and offer a maximum amount of economy and reliability.

Among the major problems encountered in mechanical commutators have been the relatively high degree of brush wear. Much of this brush wear is related to high speed operation and occurs when a brush makes and breaks contact with electrical contacts which are generally disposed at different surface levels with respect to the insulated plate with which the contacts are generally associated.

Another problem sometimes encountered in the manufacture of mechanical commutators has been the amount of soldering and electrical connections which must be made in wiring a large number of contacts to appropriate circuitry. Such wiring is not only expensive and time consuming, but also increases the likelihood of defects within a system resulting from defective electrical connections.

It is known that mechanical commutators must often be designed for a particular application. The reasons for this are that the number of sources to be sampled may be different having different impedances or signal levels, various phasing problems may be more critical in some applications than others, and for various other reasons. Standard parts easily adaptable for use in building a wide variety of different types of commutators for different applications would be highly desirable.

It is an object of this invention to provide a novel switching device in which brush wear is minimized.

It is a further object of this invention to provide an improved switching device for sampling a plurality of signal sources in which the wiring required in manufacturing such as a switching device is minimized.

It is still a further object of this invention to provide an improved type of sampling switch which may be readily assembled in a variety of forms and configurations using similar type parts.

It is still a further object of this invention to provide an improved switching device having long life, low move generation, a minimum amount of thermoelectric effects and low contact resistance.

In accordance with the present invention, a device is provided which may be used in sequentially sampling or decommutating electrical signals. A plurality of brush elements is disposed to electrically engage one or more contacts. The brush elements or the contacts are disposed in an offset or staggered relationship with respect to the other. Means for relatively moving the brush elements and the contacts with respect to each other are provided. A different brush element electrically engages one or more contacts at different time intervals. Additional means, which may include another brush and contact, are provided for connecting the sampled signals to an output circuit.

Other objects and advantages of the present invention will be apparent and suggest themselves to those skilled in the art to which the present invention is related, from a reading of the following specification and claims, in conjunction with the accompanying drawings, in which;

FIGURE 1 is an elevational view, partly in cross section illustrating a sampling switch, in accordance with the present invention;

FIGURE 2 is a view taken along lines 2—2 of FIGURE 1;

FIGURE 3 is a view looking downward on a brush holder illustrated in FIGURE 1;

FIGURE 7 is a front view illustrating various parts which may be employed in assembling another form of sampling switch, in accordance with the present invention;

FIGURE 8 is a front view illustrating a drum member comprising the various parts of FIGURE 7 in an assembled form;

FIGURE 9 is a view of a brush holder assembly which may be employed in conjunction with the drum member illustrated in FIGURE 8;

FIGURE 10 is a view illustrating the drum member of FIGURE 8 and the brush holder of FIGURE 9 in operative positions with respect to each other, and FIGURES 11 and 12 illustrate a drum member and brush assembly, respectively, which may be incorporated into still another form of the present invention.

Figure 4:
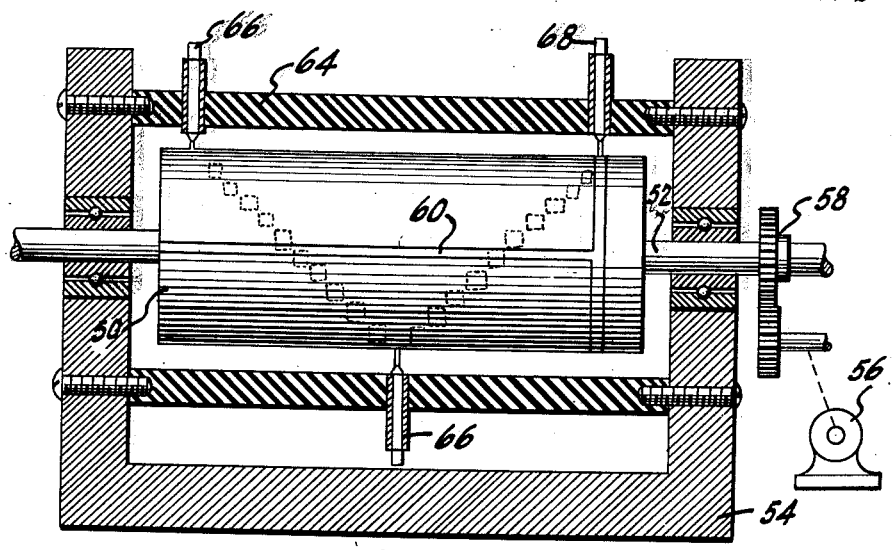
FIGURE 4 is an elevational view, partly in cross section, illustrating another form of sampling switch, in accordance with the present invention.

Referring particularly to FIGURES 1, 2 and 3, a commutator or sampling switch 20 includes drum member 22, made of suitable insulating material, having a plurality of rings 23 and a ring 40 secured thereto. The drum member 22 is connected to a shaft 24, which is rotatably mounted to a frame member 26. A motor 28 is connected to drive the shaft 24 and the drum member 22 through a gear reduction mechanism 30. The motor 28 may be disposed inside the drum member 22 if space requirements are critical.

A brush holder 32 is suitable mounted to the frame member 26 and includes an assembly of spring loaded brushes 34. The springs providing the force may be of the constant force type. A brush 36 is the last disposed brush in the assembly, although it may be disposed anywhere along the assembly. The brushes 34 are disposed to engage the rings 23 and the brush 36 is disposed to engage the ring 40. When the drum member 22 is rotated by the motor 28, the brushes 34 and 36, being maintained under tension by a group of springs, such as a spring 38, frictionally engage the rings 23 and 40.

In a preferred embodiment of the invention, each of the rings 23 may comprise suitable insulating material with the exception of the ring 40 which may be metal or other suitable type of conductive material. Each of the rings 23 include a relatively small electrically conductive contact, such as a contact 42, which extends through the drum member 22 and adapted to be connected to other electrical circuitry. If desired, the rings 23 may be made of metal having a portion cut away so that the contacts are insulated from the main body of the rings. The contacts 42 are in a staggered relationship with respect to each other so that only one of the contacts 42 engage any one of the brushes 34 at any one time with each of the brushes engaging a corresponding contact once per revolution of the drum member. The contacts 42 are electrically connected to each other and to the solid conductive ring 40 by a wire or other conductive means within the drum, as illustrated by a dotted line 44.

When the motor 28 is actuated, the drum member 22 is rotated and each of the contacts 42 sequentially engages one of the respective brushes 34 thereby electrically connecting the engaged brush through the conductive means 44 and the solid conductive ring 40 to the brush 36.

In operation, a plurality of electrical signal sources may be connected to the brushes 34 through suitable connectors illustrated by arrows 46. An output signal from the brush 36 may be applied to a utilization circuit (not shown) through a suitable connector illustrated by an arrow 48.

When the drum member 22 is rotated, each of the contacts 42 sequentially engages one at a time a respective brush 34. Output electrical signals from various signal sources connected to the brushes 34 are therefore sampled each time the drum member 22 is rotated with the sampled signals being applied to the utilization circuit through the connector 48. The time of the sampling interval is dependent upon the time interval during which a particular brush is in electrical engagement with a contact. Sampling or switching devices for sequentially sampling a plurality of signal sources and applying the sampled output signals to a utilization circuit are well known.

During the rotation of the drum member 22, the rings 23 and 40 frictionally engage the brushes 34 and 36. Constant tension springs 38 are provided to produce constant pressure and to minimize the tendency of the brushes to bounce or move away from the drum upon hitting an irregularity or rough spot thereon.

In sampling devices used heretofore, considerable brush wear occurred when the brush made or broke contact with segmented conductive contacts. The reason for this is that, regardless of the care taken in manufacturing of the commutator plates, it is extremely difficult to have the various contacts on exactly the same plane as the insulating material between the contacts. Even printed circuits fail to provide a perfectly flush commutator plate wherein the uneven surfaces between contacts and the insulating material do not affect brush wear. The present invention has minimized this problem relating to brush wear caused by uneven surfaces between the insulating material and the contacts by minimizing the number of times which a brush makes and breaks with its associated contact.

While the present invention may sometimes involve the use of a greater number of brushes than found in some conventional commutators, nevertheless, the life of the commutator before brush replacement is necessary enhances in a relationship corresponding to the number of brushes employed. Furthermore, in many types of equipment, long life of the commutator without excessive replacement and maintenance is often more important than the use of a greater number of brushes. This is especially true in many types of government equipment involving a large number of measurements in a telemetering system associated with a missile, for example.

The insulated portions of the rings 23 should preferably be a material which has a relatively low coefficient of friction with respect to the brush material to further minimize the wear of the brushes. Various types of insulated material such as Bakelite, Kel–F, Teflon or various plastic compositions may be employed. The brushes may be preferably of carbon, silver, graphite or other suitable conductive low friction material. The contacts including the solid ring may be copper, silver or other type of suitable conductive material.

Referring particularly to FIGURE 4, another form of the present invention includes a drum member 50 suitably connected to be driven by a shaft 52. The shaft 52 is rotatably mounted on bearings to a frame 54. A motor 56 is mechanically connected through a gear mechanism 58 to rotate the shaft 52 and, consequently, the drum member 50.

Figure 5:
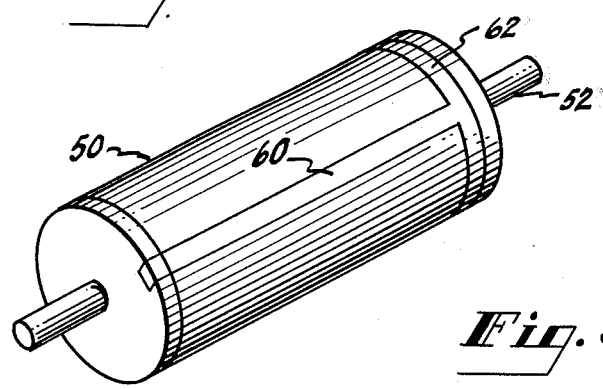
FIGURE 5 is an isometric view illustrating in greater detail the drum member of FIGURE 4.

The drum member 50, more clearly illustrated in FIGURE 5, comprises a drum of insulated material having a conductive strip 60 extending longitudinally along the drum 50 and a conductive strip or ring 62 extending around the periphery of the drum. The strip 60 is electrically connected directly to the ring 62. This arrangement provides a highly useful purpose, since extensive wiring may be eliminated, as will be seen.

A cylindrical brush holder 64 is suitably mounted to the frame 54 and is disposed around the drum 50. The brush holder 64 includes a plurality of apertures 70 disposed in staggered relationship around the periphery thereof. The apertures are adapted to receive a plurality of brushes 66 and 68. The brushes 66 and 68 are spring loaded to continuously engage the insulated or conductive portions of the drum 50.

Figure 6:
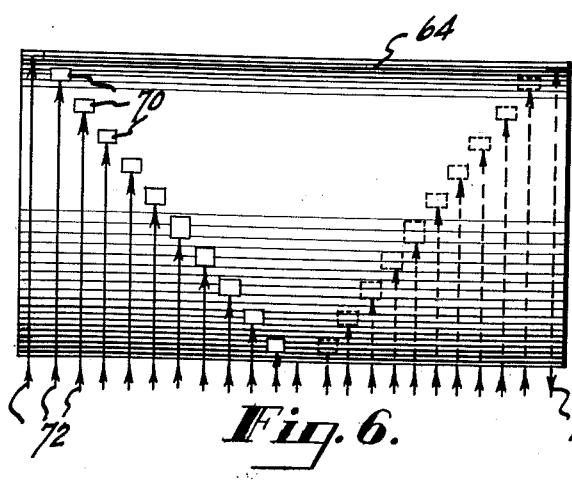
FIGURE 6 is a front view illustrating in somewhat greater detail the brush holder assembly of FIGURE 4.

In operation, when the drum 50 is rotated, the strip 60 sequentially engages one at a time all of the brushes 66. The brushes 66 may be connected to a plurality of signal sources by means of input connectors 72 (FIGURE 6). The brush 68 continuously engages the ring 62 and is connected to an output connector 74, which in turn, may be connected to a utilization circuit, such as a transmitter in a telemetering system.

The arrangement illustrated in FIGURE 4 is somewhat similar in function to the arrangement illustrated in FIGURE 1. One of the main differences between FIGURES 1 and 4 is that the arrangement of FIGURE 1 involves the staggering of the individual contacts with the brushes being disposed in a straight line, whereas, the arrangement of FIGURE 4 involves the staggering of the brushes with the contact being in a straight line.

The embodiment of FIGURE 4 utilizes the conductive strip 60 which makes it possible to eliminate the necessity of connecting small individual contacts by wiring or other means to the output conductive ring. When the drum member 50 is rotated, each of the brushes 60 makes and breaks with the conductive strip 60 once per revolution. As was pointed out in connection with FIGURE 1, most brush wear and noise occurs as a result of the brushes bouncing when engaging and disengaging a contact or segment a relatively large number of times during operation, such wear resulting from the planar irregularities existing between the contacts and the insulating material. Thus the arrangement of FIGURE 4 also provides the advantage of minimum brush wear and consequently, long commutator life with a minimum amount of maintenance or replacement of parts.

The brush holder 64 may be made of insulating material, although this is not absolutely necessary if insulation between the brushes were otherwise provided.

In FIGURES 1 and 4, it was illustrated that either brushes or contacts could be staggered while the other was in a relatively straight alignment. Other arrangements which combines these features in a variety of ways are within the scope of this invention. For example, it may be desirable to stagger some of the brushes with some of the contacts aligned, and vice versa.

Referring particularly to FIGURES 7 and 8, a number of separate pieces which may be made into a drum assembly 76 is illustrated. In FIGURE 7, a plurality of similar type conductive rings 78 are disposed between a plurality of round insulated members 80 each having a strip or electrically conductive contact 82.

All the insulated members 80 and the conductive rings 78, being of substantially the same type, may be produced efficiently in mass quantities. In assembling the rings 78 and the members 80, the contacts 82 may be staggered with respect to each other. The assembly 76 may be employed with a brush holder 84 which includes a plurality of brushes 86. The brush holder 86 is illustrated in FIGURE 9.

The brushes 86 are divided into groups of three, with each of the brushes within each group disposed to engage one of the contacts 82 of the assembly 76. FIGURE 10 illustrates the brush 86 of the holder 84 in engagement with the assembly 76.

The conductive rings 78 electrically connect the contacts 82 to each other and to a last ring 86 which may be the take off ring connected to a brush 88. The brush 88, in turn, may be connected to a utilization circuit.

In this embodiment, a commutator or sampling switch involving a variety of different forms may be constructed using the same type parts. Various phase relationships between the contacts 82 may be readily adjusted by merely changing the angular positions of the contacts with respect to adjacent contacts.

If desired, the contacts 82 may be made relatively narrow so as to engage only a single brush. In this case, the insulated members 80 may be made relatively narrow. If this is done, an arrangement somewhat similar to the arrangement of FIGURE 1 would result, except that the conductive rings 78 of FIGURE 7 would take the place of the conductive wire connected between the contact segments of FIGURE 1.

Also, if desired, a greater number than three brushes per group may be employed and the contacts 82 and the insulated member 80 may be made wider. The particular arrangement used will depend largely upon the particular application involved, space requirements, number of sources to be sampled and various other factors.

Referring to FIGURES 11 and 12, there is illustrated still another embodiment of the present invention. A drum member 90 is illustrated in FIGURE 11 and a brush holder 92, which may be associated with the drum member 90 during operation, is illustrated in FIGURE 12.

The drum member 90 includes a solid electrically conductive contact 94 extending in a helical direction around the surface of the drum member. A conductive slip ring 96 is integrally connected to the helical shaped contact 94 and extends around the periphery of the drum member 90.

The brush holder 92 includes a pluarlity of input brushes 98 and an output brush 100. The brushes 98 and 100, while aligned with respect to each other, are disposed at an angle with respect to the drum member 90.

In operations, the drum member 90 and the brush holder 92 may be suitably mounted with respect to each other in substantially the same manner as illustrated and described in connection with FIGURE 1. The drum member 90 may be rotated with the helical shaped contact engaging one at a time one of the brushes 98 and contacting all of the brushes 98 once for each revolution of the drum member. The brushes 98 are offset at a slight angle so that they are in proper alignment when engaging the contact 94. The brush 100 continuously engages the ring 96 during operation. Consequently, a plurality of signal sources connected to the input brushes 98 may be sampled and applied to a utilization circuit through the output brush 100.

Again, as in FIGURE 1, each of the brushes 98 engage a contact only once per revolution of the drum member. Therefore, the wear of the brushes 98 is minimized for reasons previously discussed. The solid helical contact 94 elminates the necessity of wiring a large number of contacts together, as in FIGURE 1.

While several embodiments have been illustrated, it is evident that the present invention may take a wide variety of different forms dependent upon the particular application involved. While drums have been illustrated, it is conceivable in some applications that a flat circular plate or even a rectangular plate with a reciprocating brush movement may be employed. The particular sizes and shapes of the brushes and contacts may be different than those illustrated. Numerous different types of insulating materials and conductive materials may also be used in place of those specifically mentioned. The application of the devices illustrated is not limited to telemetering systems as specifically discussed, but may be used in numerous different type systems involving switching or sampling operations. Also, the switching device disclosed may be employed in decommutation systems as well as other systems requiring the use of a switch functioning in the manner described.

What is claimed is:

1. A switching device comprising a brush holder, a plurality of brushes disposed within said brush holder, a cylindrical member movable with respect to said brush holder, a plurality of segmented contacts extending circumferentially about the periphery of said cylindrical member, means for electrically connecting said plurality of contacts to each other, said brushes and contacts extending along the length of said cylindrical member and being aligned with respect to each other so that one brush engages a corresponding contact when said cylindrical member is moved, means for moving said cylindrical member to cause said contacts to sequentially engage said brushes, said plurality of contacts and said plurality of brushes being angularly disposed with respect to each other whereby only one of said brushes engages one of said contacts at one time for each revolution of said cylindrical member.

2. A switching device as set forth in claim 1 wherein means are provided for electrically connecting said plurality of segmented contacts to each other.

References Cited in the file of this patent

UNITED STATES PATENTS

| | | | |
|---|---|---|---|
| 685,960 | Wirt | | Nov. 5, 1901 |
| 1,110,676 | Flint | | Sept. 15, 1914 |
| 1,311,437 | Conklin | | July 29, 1919 |
| 1,343,141 | Kenagy | | June 8, 1920 |
| 1,731,513 | Wagner | | Oct. 15, 1929 |
| 2,167,750 | Hale | | Aug. 1, 1939 |
| 2,496,021 | Reed | | Jan. 31, 1950 |
| 2,852,628 | Fry | | Sept. 16, 1958 |

FOREIGN PATENTS

| | | |
|---|---|---|
| 750,188 | France | May 22, 1933 |